United States Patent
Yao et al.

(10) Patent No.: US 11,174,961 B2
(45) Date of Patent: Nov. 16, 2021

(54) VALVE ELEMENT FOR ELECTRONIC EXPANSION VALVE

(71) Applicant: Jiangxi Audy Brasswork Inc., Shangrao (CN)

(72) Inventors: Peng Yao, Weihui (CN); Zhenbin Chen, Putian (CN)

(73) Assignee: Jiangxi Audy Brasswork Inc., Jiangxi (CN)

( * ) Notice: Subject to any disclaimer, the term of this patent is extended or adjusted under 35 U.S.C. 154(b) by 0 days.

(21) Appl. No.: 16/985,134

(22) Filed: Aug. 4, 2020

(65) Prior Publication Data

US 2021/0088152 A1 Mar. 25, 2021

(30) Foreign Application Priority Data

Sep. 25, 2019 (CN) .......................... 201910910289.3

(51) Int. Cl.
  *F16K 31/06* (2006.01)
  *F16K 17/04* (2006.01)
  *F16K 3/24* (2006.01)

(52) U.S. Cl.
  CPC ................ *F16K 31/06* (2013.01); *F16K 3/24* (2013.01); *F16K 17/04* (2013.01)

(58) Field of Classification Search
  CPC ............. F16K 31/06; F16K 3/24; F16K 17/04

USPC ..................................................... 251/129.01
See application file for complete search history.

(56) References Cited

U.S. PATENT DOCUMENTS

| 2,918,083 A * | 12/1959 | Clark, Jr. ............... | F16K 15/026 |
| | | | 137/515.5 |
| 5,868,499 A * | 2/1999 | Greubel .............. | F15B 15/1419 |
| | | | 384/15 |
| 2011/0084224 A1* | 4/2011 | Zhan ...................... | F25B 41/31 |
| | | | 251/129.01 |
| 2019/0063461 A1* | 2/2019 | Espelien ................... | F25B 1/10 |

FOREIGN PATENT DOCUMENTS

WO   WO-2017101547 A1 *   6/2017   ............... F16K 1/38

* cited by examiner

*Primary Examiner* — Kevin R Barss
(74) *Attorney, Agent, or Firm* — CBM Patent Consulting, LLC (57) ABSTRACT

The invention discloses a valve element for an electronic expansion valve, which includes a rotor core and a hollow rotor cylinder sleeved outside the rotor core. Ribs and positioning grooves of a positioning device on the valve element are changed, so that the positioning grooves and an inner wall of a guiding section hole are stepped, an even thickness of the inner wall is maintained, and a working performance of the electronic expansion valve is improved.

8 Claims, 8 Drawing Sheets

VALVE ELEMENT FOR ELECTRONIC EXPANSION VALVE

TECHNICAL FIELD

The present invention relates to an electronic expansion valve in the field of air conditioning refrigeration or heat pump systems, and more particularly, to a valve element for an electronic expansion valve.

BACKGROUND

As well all know, an electronic expansion valve has been widely used in the field of air conditioning refrigeration or heat pump systems to adjust throttling, depressurization and a flow of a fluid. The electronic expansion valve uses an adjusted parameter to generate a signal, controls a voltage or a current applied to a coil to generate a magnetic field according to a program set by a computer, and drives a valve element of a main valve body to rotate to change a flow area of a valve port, thus adjusting the flow automatically.

Figure 1:
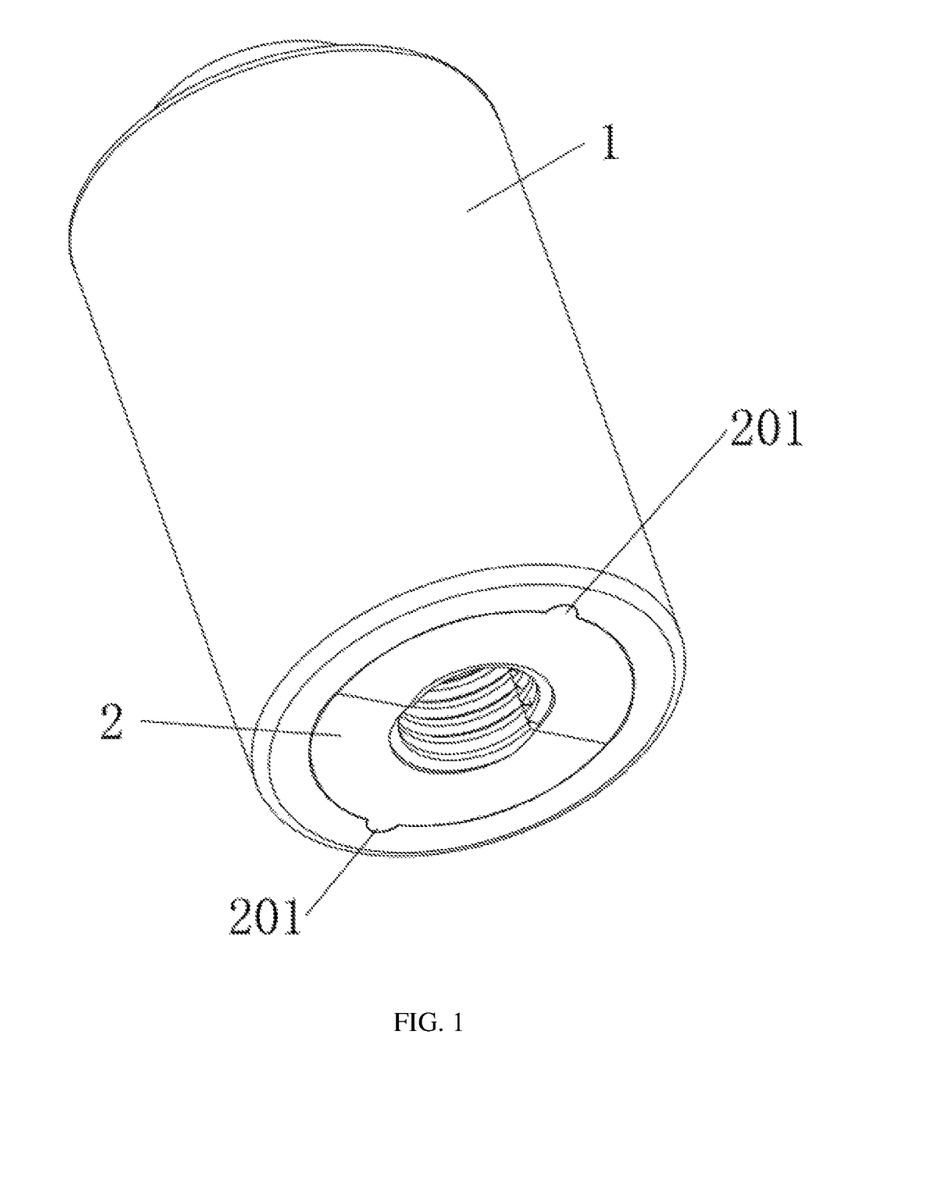
FIG. 1 is a stereoscopic diagram of a valve element at a current stage (from the bottom)
Figure 2:
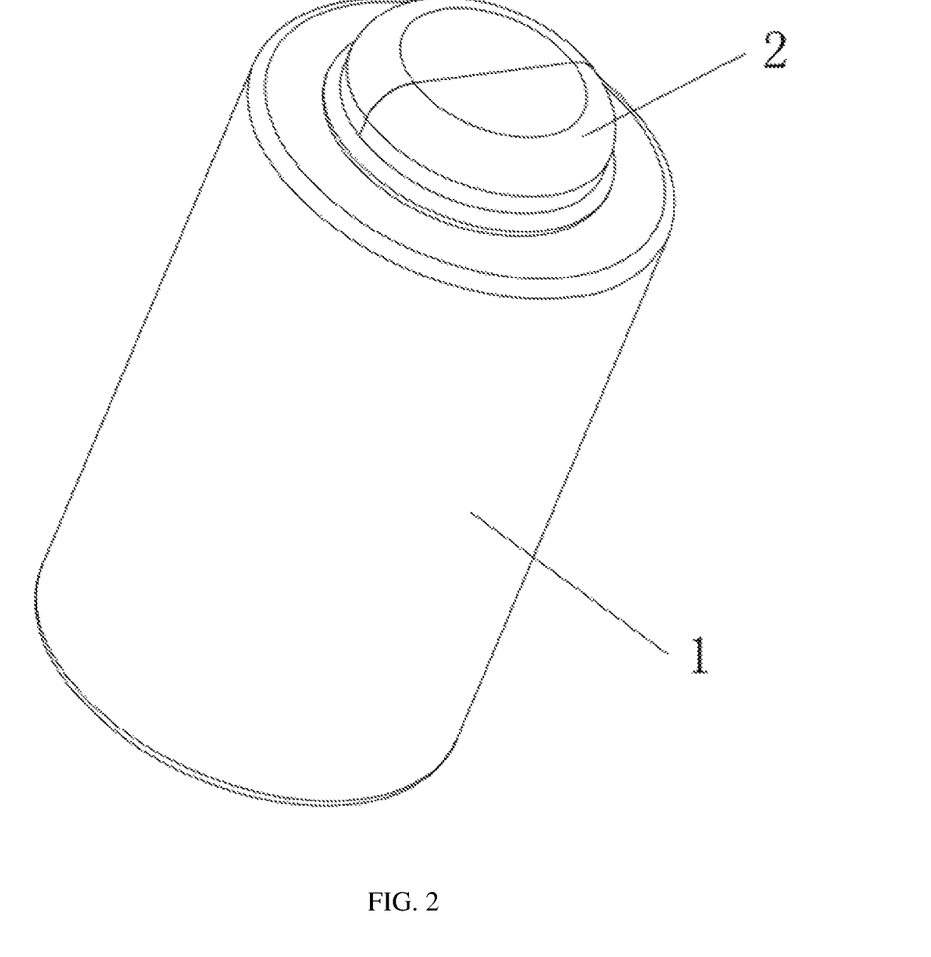
FIG. 2 is a stereoscopic diagram of the valve element at the current stage (from the top)
Figure 3:
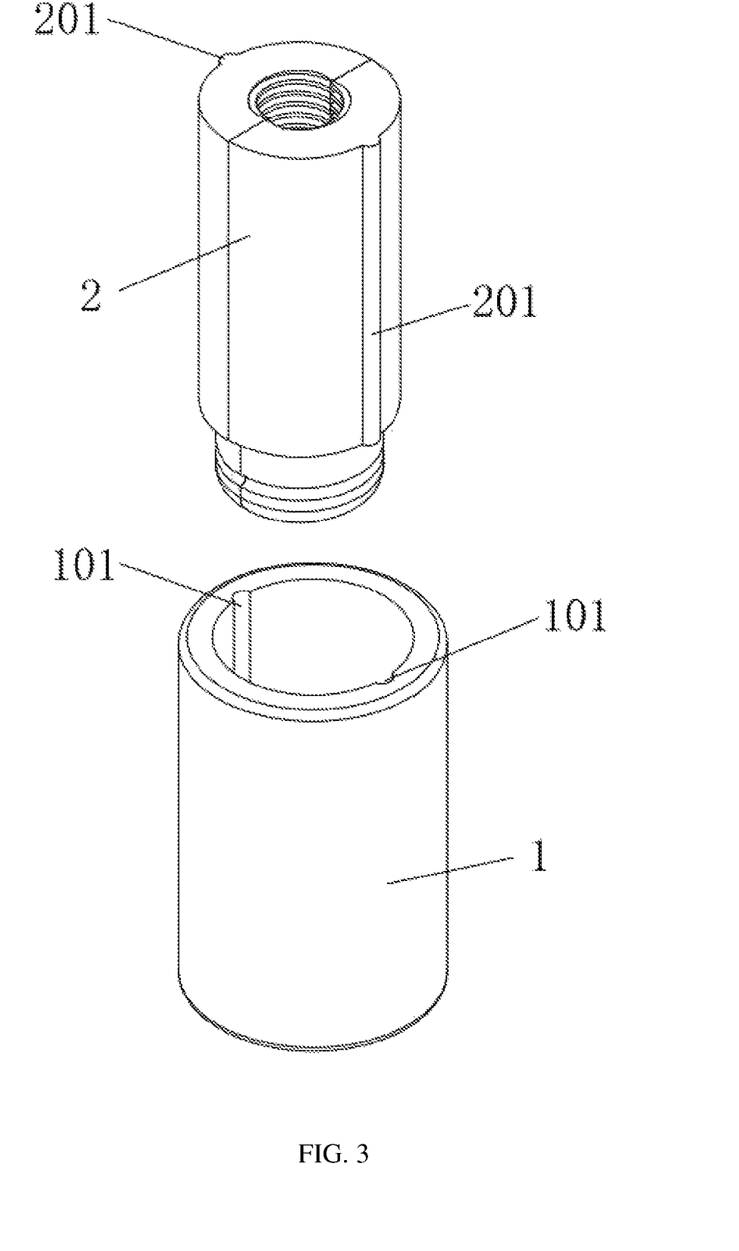
FIG. 3 is an installation diagram of the valve element at the current stage.
Figure 4:
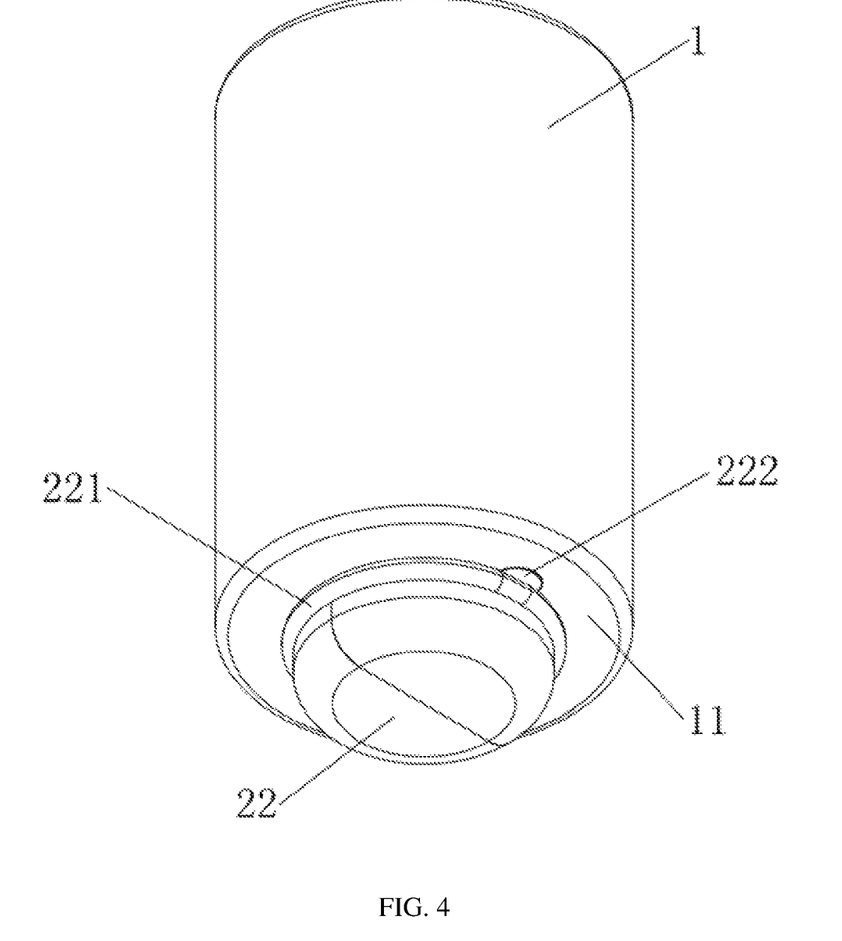
FIG. 4 is a first stereoscopic diagram of the present invention (from the bottom)
Figure 5:
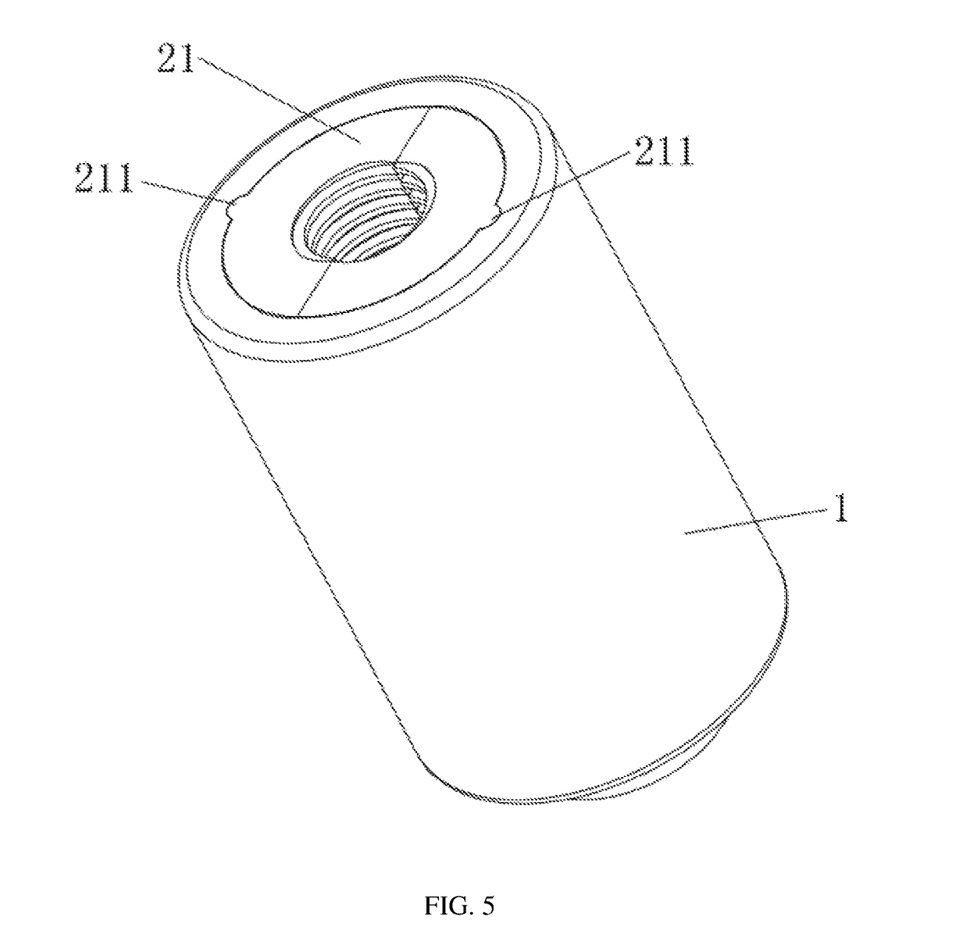
FIG. 5 is a second stereoscopic diagram of the present invention (from the top)
Figure 6:
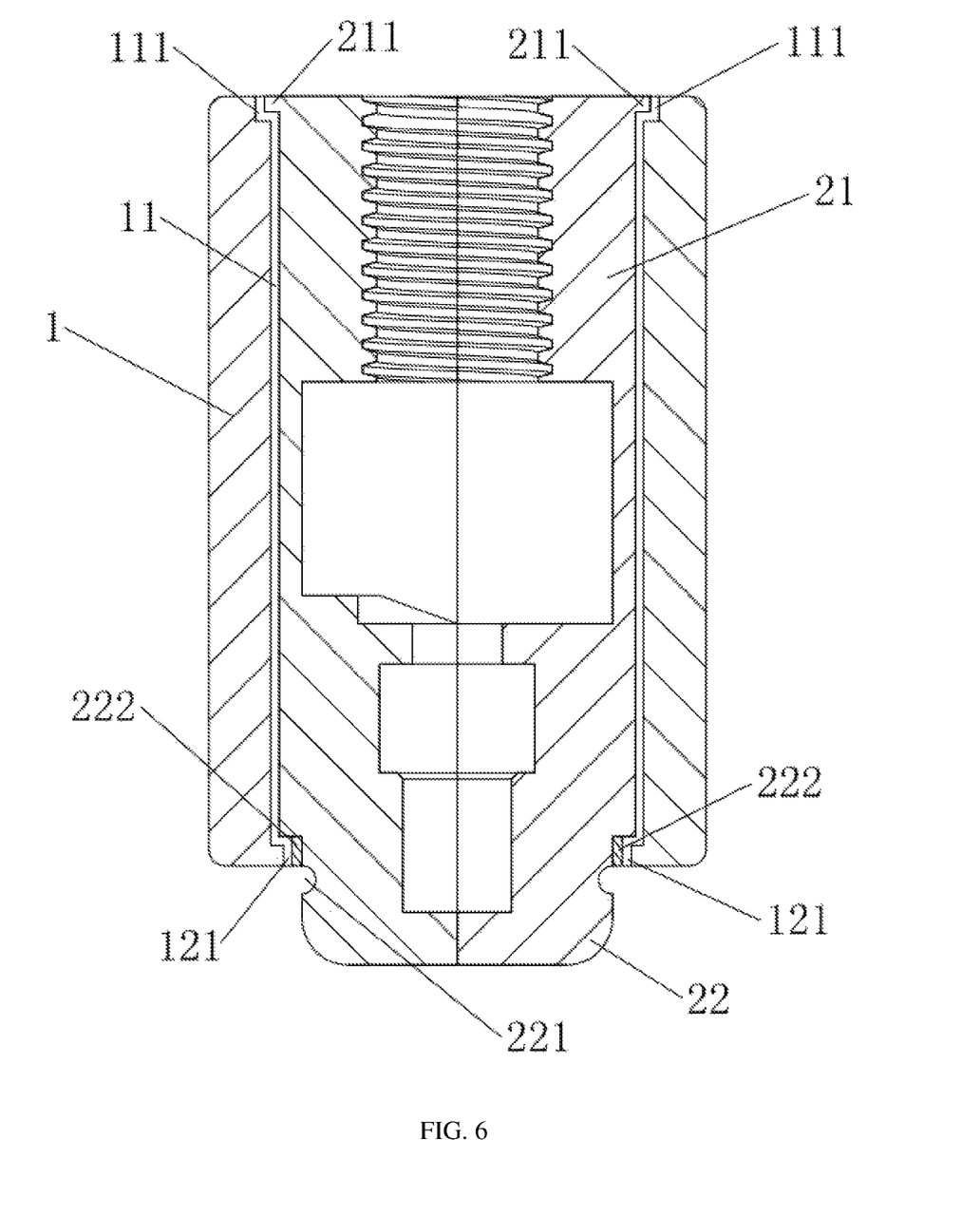
FIG. 6 is a structure diagram of the present invention.
Figure 7:
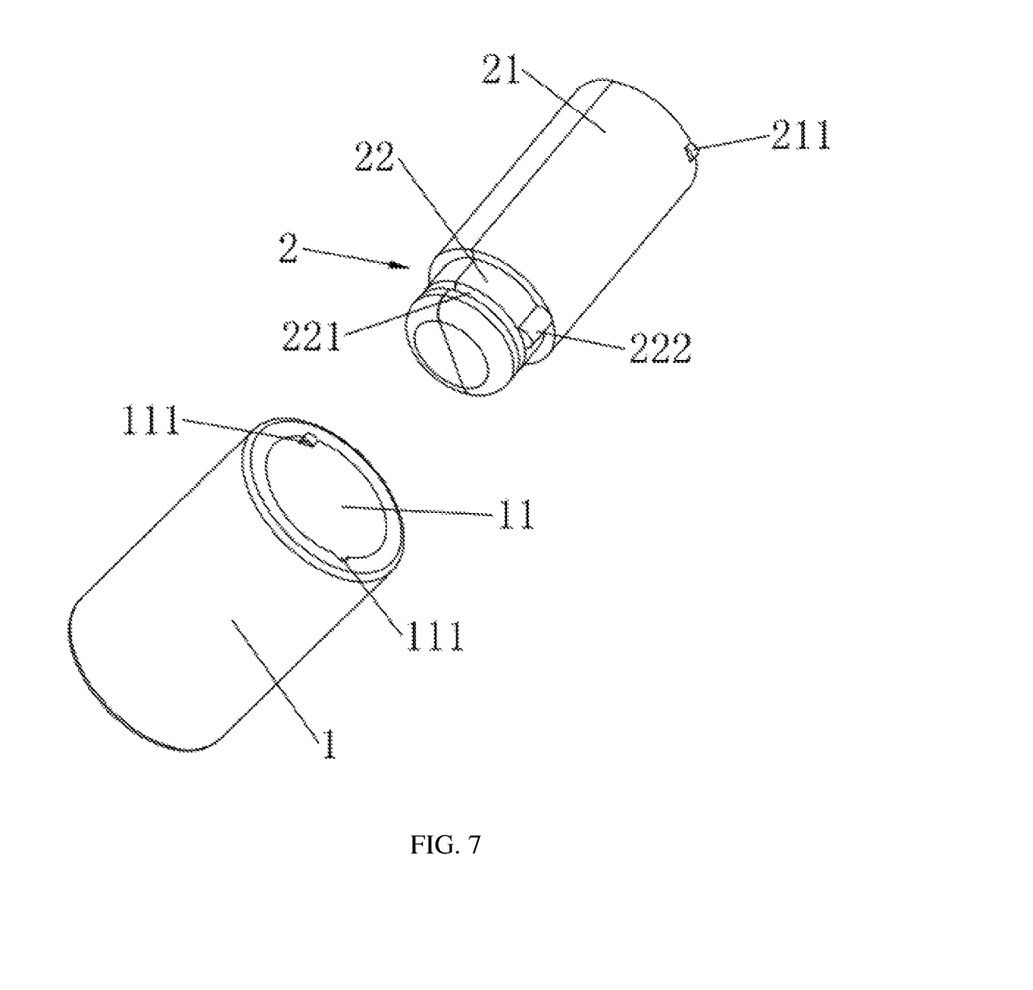
FIG. 7 is an assembly diagram of the present invention.
Figure 8:
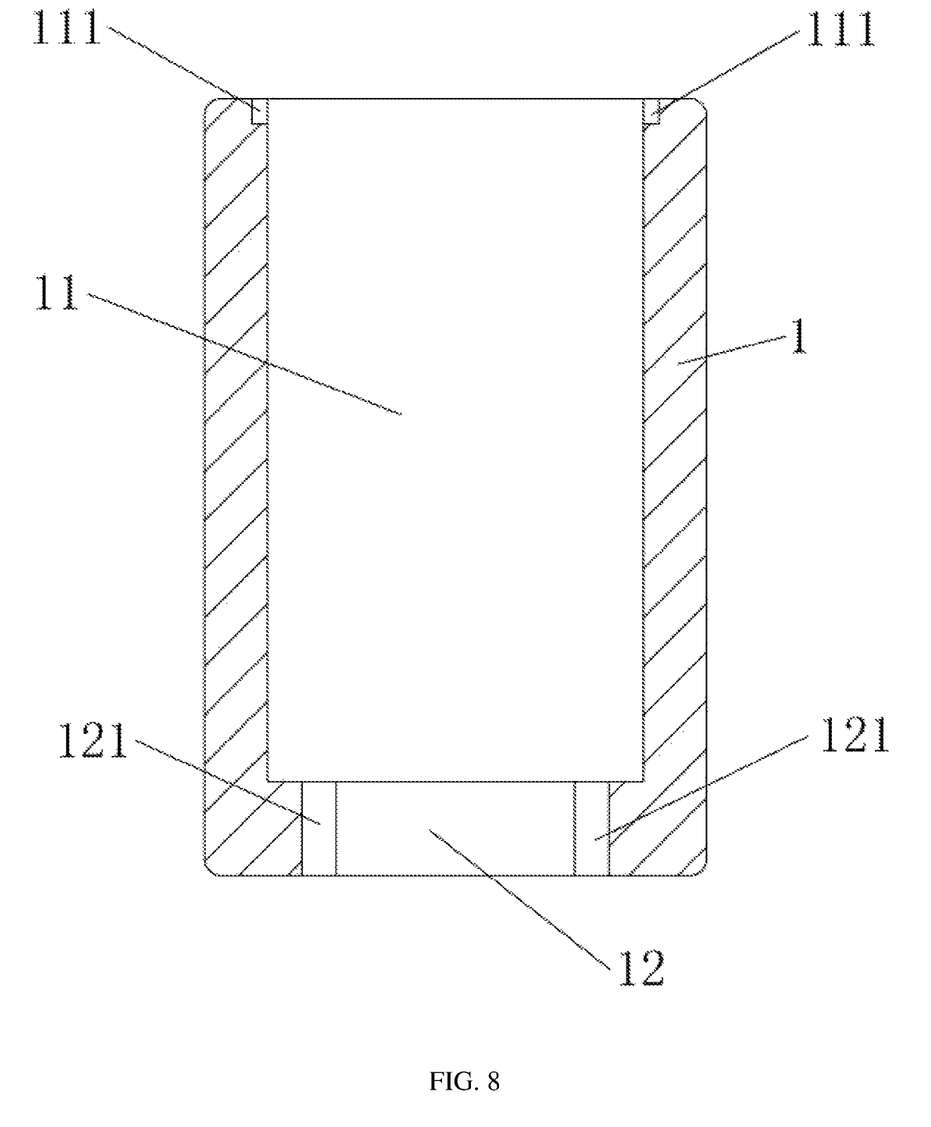
FIG. 8 is a structure diagram of a rotor cylinder of the present invention.

As shown in FIG. 1 to FIG. 3, the valve element currently used in the electronic expansion valve is composed of a rotor cylinder 1 and a rotor core 2 sleeved in the rotor cylinder 1. A pair of strip-shaped positioning grooves 101 penetrating a whole inner wall of the rotor cylinder 1 are arranged inside the rotor cylinder 1, and a pair of strip-shaped positioning ribs 201 which are able to be sleeved on the pair of strip-shaped positioning grooves 101 are arranged on an outer wall of the rotor core 2. The rotor cylinder 1 and the rotor core 2 are assembled by matching and clamping the strip-shaped positioning grooves 101 with the strip-shaped positioning ribs 201. Since the pair of strip-shaped positioning grooves 101 are arranged inside the rotor cylinder 1, a position on the rotor cylinder 1 provided with the strip-shaped positioning grooves 101 is weaker than that on other side walls, which means that there is a weak point at the position on the rotor provided with the positioning grooves, so that an internal magnetic field of the rotor is distributed unevenly during operation, which may lead to unstable operation, deviation in operation of the rotor and other problems during operation, resulting in poor function and performance. Meanwhile, in order to ensure an operating reliability of the whole valve element, the rotor cylinder 1 is made of neodymium iron boron, which is hard and brittle, so that when the rotor is impacted by an external force, the weak point is easy to break, thus having a certain potential quality hazard. Meanwhile, in order to ensure that the function and the performance of the rotor are not affected during operation, and to make the weak point unbreakable, people make a whole wall of the rotor thicker, which increases a cost of producing the rotor. In addition, the rotor of the valve element is currently a magnetic rotor, and 10 pairs of magnetic poles are evenly distributed on a peripheral wall of the magnetic rotor. Therefore, a thickness of an inside wall of the magnetic rotor is inconsistent, which may lead to a phenomenon of uneven distribution of the internal magnetic field. This phenomenon may make the whole expansion valve fluctuate greatly during operation, thus affecting a performance of the expansion valve.

SUMMARY

The present invention is intended to overcome the shortcomings of the prior art, and provides a valve element with a reasonable structure, a reliable quality, a better performance and a low cost.

The following technical solutions are used in the present invention to solve the above technical problem.

A valve element for an electronic expansion valve includes a rotor core 2 and a hollow rotor cylinder 1 sleeved outside the rotor core 2, the rotor core 2 is composed of a guiding section 21 and a limiting section 22 with a diameter smaller than that of the guiding section 21, and inner holes of the rotor cylinder 1 are divided into a guiding section hole 11 for the guiding section 21 to be slidably sleeved in and a limiting section hole 12 for the limiting section 22 to slidably pass through; an installation groove 221 for installing an anti-dropping clamp spring is arranged at an extending end of the limiting section 22 after the limiting section 22 passes through and extends out of the limiting section hole 12; and an aperture of the limiting section hole 12 is smaller than the diameter of the guiding section 21; a first positioning rib 211 is arranged on a side wall at an end of the guiding section 21 far away from the limiting section 22; a second positioning rib 222 is arranged on a side wall of the limiting section 22 located inside the installation groove 221; a first positioning groove 111 matched with the first positioning rib 211 is arranged at an outer end of the guiding section hole 11, and a second positioning groove 121 for the second positioning rib 222 to fall in is arranged on an inside wall of the limiting section hole 12.

In the above valve element for the electronic expansion valve, the second positioning groove 121 may penetrate a whole inside wall of the limiting section hole 12, and the second positioning rib 222 is able to completely fall into the penetrated second positioning groove 121; and the second positioning groove 121 may also be a stepped blind hole in the inside wall of the limiting section hole 12, and the second positioning rib 222 is able to completely fall into the second positioning groove 121 of the stepped blind hole type.

Further, a length of the guiding section 21 may be longer than that of the limiting section 22.

Further, the first positioning groove 111 and an inner wall of the guiding section hole 11 are stepped.

In the above valve element for the electronic expansion valve, the rotor cylinder 1 is a magnetic rotor cylinder, and 10 pairs of magnetic poles are evenly distributed on a peripheral wall of the magnetic rotor cylinder.

In the above valve element for the electronic expansion valve, two first positioning ribs 211 in pairs and two second positioning ribs 222 in pairs are provided, which are symmetrically distributed on the side wall of the guiding section 21 and the side wall of the limiting section 22 respectively; and two first positioning grooves 111 in pairs and two second positioning grooves 121 in pairs are provided, which are symmetrically distributed at the outer end of the guiding section hole 11 and the inside wall of the limiting section hole 12.

According to the above valve element for the electronic expansion valve, the valve element for the electronic expansion valve of the present invention may have the following changes.

1. Four first positioning ribs 211 in two pairs and four second positioning ribs 222 in two pairs are provided, which are symmetrically distributed on the side wall of the guiding section 21 and the side wall of the limiting section 22 respectively; and four first positioning grooves 111 in two pairs and four second positioning grooves 121 in two pairs are provided, which are symmetrically distributed at the outer end of the guiding section hole 11 and the inside wall of the limiting section hole 12.

2. Six first positioning ribs 211 in three pairs and six second positioning ribs 222 in three pairs are provided, which are symmetrically distributed on the side wall of the guiding section 21 and the side wall of the limiting section 22 respectively; and six first positioning grooves 111 in three pairs and six second positioning grooves 121 in three pairs are provided, which are symmetrically distributed at the outer end of the guiding section hole 11 and the inside wall of the limiting section hole 12.

Compared with the prior art, the present invention has the beneficial effects that: the first positioning groove 111 and the second positioning groove 121 are respectively arranged at the outer end of the guiding section hole and the inner wall of the limiting section hole of the inner holes of the rotor cylinder, and the first positioning groove 111 and the inner wall of the guiding section hole are stepped, so that the thickness of the side wall of the rotor cylinder is consistent, thus having no weak point on the inside wall of the rotor. Therefore, the magnetic field is distributed evenly and operated stably during operation. Similarly, it is not necessary to make the whole wall of the rotor cylinder thicker, thus saving the cost of producing the rotor cylinder and ensuring that no potential quality hazard exists when the rotor cylinder is impacted by an external force. Therefore, the present invention is reliable in quality. Meanwhile, due to the consistent thickness of the side wall of the rotor cylinder, the internal magnetic field is distributed evenly, so that the whole expansion valve has small stable fluctuation during operation and a good operating accuracy. Therefore, the present invention has a reasonable structure, a reliable quality and a low cost.

The present invention is further described in detail hereinafter with reference to the accompanying drawings and the specific embodiments.

DETAILED DESCRIPTION

Embodiment 1

A valve element for an electronic expansion valve as shown in FIG. 4 to FIG. 8 includes a rotor core 2 and a hollow rotor cylinder 1 sleeved outside the rotor core 2. The rotor cylinder 1 may be a magnetic rotor cylinder, and 10 pairs of magnetic poles are evenly distributed on a peripheral wall of the magnetic rotor cylinder. The rotor core 2 is composed of a guiding section 21 and a limiting section 22 with a diameter smaller than that of the guiding section 21. Inner holes of the rotor cylinder 1 are divided into a guiding section hole 11 for the guiding section 21 to be slidably sleeved in and a limiting section hole 12 for the limiting section 22 to slidably pass through. An installation groove 221 for installing an anti-dropping clamp spring is arranged at an extending end of the limiting section 22 after the limiting section 2 passes through and extends out of the limiting section hole 12. An aperture of the limiting section hole 12 is smaller than the diameter of the guiding section 21, that is to say, after the rotor core 2 is sleeved into the inner hole of the rotor cylinder 1, the guiding section 21 thereof cannot penetrate into the limiting section hole 12, so as to prevent the rotor core from slipping out of the limiting section hole. A first positioning rib 211 is arranged on a side wall at an end of the guiding section 21 far away from the limiting section 22. A second positioning rib 222 is arranged on a side wall of the limiting section 22 located inside the installation groove 221. A first positioning groove 111 matched with the first positioning rib 211 is arranged at an outer end of the guiding section hole 11, and a second positioning groove 121 which penetrates a whole inside wall and enables the second positioning rib 222 to fall in is arranged on the inside wall of the limiting section hole 12.

In the embodiment, the end of the rotor core 2 provided with the limiting section 22 is sleeved in the inner hole of the rotor cylinder 1 during assembling. At the moment, an outside wall of the guiding section 21 contacts the inside wall of the guiding section hole 11 to play a role of guiding, and then the rotor core 2 slides down slowly under guidance of the guiding section 21. As the rotor core 2 slides down slowly, the limiting section 22 may pass through the limiting section hole 12, with an end portion thereof exposed outside the rotor cylinder 1. Meanwhile, the first positioning rib 211 on the guiding section 21 and the second positioning rib 222 on the limiting section 22 fall into the first positioning groove 111 and the second positioning groove 121 respectively. Finally, the anti-dropping clamp spring is installed in the installation groove 221 at the extending end of the limiting section 22 to complete assembly of the rotor cylinder and the rotor core.

A length of the guiding section 21 is longer than that of the limiting section 22.

The first positioning groove 111 and an inner wall of the guiding section hole 11 are stepped, that is to say, the first positioning groove 111 does not penetrate the whole inner wall of the guiding section hole.

In the embodiment, two first positioning ribs 211 in pairs and two second positioning ribs 222 in pairs are provided, which are symmetrically distributed on the side wall of the guiding section 21 and the side wall of the limiting section 22 respectively. Two first positioning grooves 111 in pairs and two second positioning grooves 121 in pairs are provided, which are symmetrically distributed at the outer end of the guiding section hole 11 and the inside wall of the limiting section hole 12.

Embodiment 2

According to a valve element for an electronic expansion valve, a second positioning groove 121 may also be a stepped blind hole in an inside wall of a limiting section hole 12, and a second positioning rib 222 is able to completely fall into the second positioning groove 121 of the stepped blind hole type. Four first positioning ribs 211 in two pairs and four second positioning ribs 222 in two pairs are provided, which are symmetrically distributed on a side wall of a guiding section 21 and a side wall of a limiting section 22 respectively. Four first positioning grooves 111 in two pairs and four second positioning grooves 121 in two pairs are provided, which are symmetrically distributed at an outer end of a guiding section hole 11 and an inside wall of the limiting section hole 12. The rest is the same as the embodiment 1.

Embodiment 3

According to a valve element for an electronic expansion valve, six first positioning ribs 211 in three pairs and six second positioning ribs 222 in three pairs are provided, which are symmetrically distributed on a side wall of a guiding section 21 and a side wall of a limiting section 22 respectively. Six first positioning grooves 111 in three pairs and six second positioning grooves 121 in three pairs are provided, which are symmetrically distributed at an outer end of a guiding section hole 11 and an inside wall of a limiting section hole 12. The rest is the same as the embodiment 1.

Comparative Example 1

When the prior art is used, a valve element on an electronic expansion valve is composed of a rotor cylinder 1 and a rotor core 2 sleeved in the rotor cylinder 1. The rotor cylinder 1 may be a magnetic rotor cylinder, and 10 pairs of magnetic poles are evenly distributed on a peripheral wall of the magnetic rotor cylinder. A pair of strip-shaped positioning grooves 101 penetrating a whole inner wall of the rotor cylinder 1 are arranged inside the rotor cylinder 1, and a pair of strip-shaped positioning ribs 201 which are able to be sleeved on the pair of strip-shaped positioning grooves 101 are arranged on an outer wall of the rotor core 2. The rotor cylinder 1 and the rotor core 2 are assembled by matching and clamping the strip-shaped positioning grooves 101 with the strip-shaped positioning ribs 201.

Effect Comparison 1. 20 rotor cylinders 1 (with an outer diameter of 15.8 mm and an inner diameter of 12 mm) on the electronic expansion valves in each embodiment and 20 rotor cylinders 1 (with an outer diameter of 15.8 mm and an inner diameter of 12 mm) on the electronic expansion valves in the comparative example are prepared. A damage rate of each group is observed by testing at a falling height of 1 m according to GB/T 2423.8-1995 (free falling test method). Test results refer to Table 1.

2. 20 rotor cylinders 1 (with an outer diameter of 15.8 mm and an inner diameter of 12 mm) on the electronic expansion valves in each embodiment and 20 rotor cylinders 1 (with an outer diameter of 15.8 mm and an inner diameter of 12 mm) on the electronic expansion valves in the comparative example are prepared. A radial crushing force thereof is tested according to GB/T 6804-2008 (determination of a radial crushing strength of a sintered metal lining) Test results refer to Table 1.

TABLE 1

Strength comparison of magnetic rotor cylinder

| Group | Falling damage rate (%) | Radial crushing force (N) |
|---|---|---|
| Embodiment 1 | 5 | 252 |
| Embodiment 2 | 10 | 246 |
| Embodiment 3 | 10 | 244 |
| Comparison 1 | 45 | 158 |

3. The rotor element in each embodiment and the rotor element in the comparative example are assembled into the electronic expansion valves, and 20 electronic expansion valves provided with the rotor elements are prepared for each embodiment and the comparative example respectively. Operating states of the electronic expansion valves during adjustment are observed with a same command parameter. Test results refer to Table 2.

4. The rotor element in each embodiment and the rotor element in the comparative example are assembled into the electronic expansion valves (with a rated operational voltage specification of DC 12 V±1.2 V), 20 electronic expansion valves provided with the rotor elements are prepared for each embodiment and the comparative example respectively. A minimum response voltage of each electronic expansion valve is measured by lowering a voltage and observing whether the electronic expansion valve is operated. Test results refer to Table 2.

TABLE 2

Performance comparison of electronic expansion valve

| Group | Operating state of electronic expansion valve | Minimum response voltage (V) |
|---|---|---|
| Embodiment 1 | Stable | 4.2 |
| Embodiment 2 | Stable | 4.1 |
| Embodiment 3 | Stable | 4.2 |
| Comparison 1 | Shaking | 5.6 |

It can be seen from Table 1 that the first positioning groove 111 and the second positioning groove 121 in the embodiment 1 to the embodiment 3 are respectively arranged at the outer end of the guiding section hole 11 and the side wall of the limiting section hole 12 of the rotor cylinder 1, and the first positioning groove 111 and the inner wall of the guiding section hole 11 are stepped, so that the rotor cylinder has an even wall thickness in the section where the guiding section hole is located excluding a wall thickness in a small section where the first positioning groove is located. Due to the even thickness of the wall of the rotor cylinder, it is ensured that no potential quality hazard exists when the rotor cylinder is impacted by an external force. The falling damage rate is reduced and the radial crushing force is increased, so that the rotor cylinder does not need to be thickened, thus saving a cost of producing the rotor cylinder and having a more reliable quality.

It can be seen from Table 2 that when the electronic expansion valve is assembled by the valve element in the embodiment 1 to the embodiment 3, an internal magnetic field of the valve element is distributed evenly and operated stably during operation, the minimum response voltage is also reduced, and the operation is sensitive. Therefore, the present invention is reliable in quality.

The above embodiments are only preferred embodiments of the present invention, and are not used to limit the implementation scope of the present invention, which means that all equivalent changes and modifications made according to the contents of the patent application scope of the present invention should belong to the technical scope of the present invention.

The invention claimed is:

1. A valve element for an electronic expansion valve, comprising a rotor core (2) and a hollow rotor cylinder (1) sleeved outside the rotor core (2), the rotor core (2) being composed of a guiding section (21) and a limiting section (22) with a diameter smaller than that of the guiding section (21), and inner holes of the rotor cylinder (1) being divided into a guiding section hole (11) for the guiding section (21)

to be slidably sleeved in and a limiting section hole (12) for the limiting section (22) to slidably pass through; an installation groove (221) for installing an anti-dropping clamp spring being arranged at an extending end of the limiting section (22) after the limiting section (22) passes through and extends out of the limiting section hole (12); and an aperture of the limiting section hole (12) being smaller than the diameter of the guiding section (21); wherein, a first positioning rib (211) is arranged on a side wall at an end of the guiding section (21) at the end opposite the limiting section (22); a second positioning rib (222) is arranged on a side wall of the limiting section (22) located inside the installation groove (221); a first positioning groove (111) matched with the first positioning rib (211) is arranged at an outer end of the guiding section hole (11), and a second positioning groove (121) for the second positioning rib (222) to fall in is arranged on an inside wall of the limiting section hole (12);

wherein the second positioning groove (121) penetrates a whole inside wall of the limiting section hole (12), and the second positioning rib (222) is able to completely fall into the penetrated second positioning groove (121).

2. The valve element for the electronic expansion valve according to claim 1, wherein the second positioning groove (121) is a stepped blind hole in the inside wall of the limiting section hole (12), and the second positioning rib (222) is able to completely fall into the second positioning groove (121) of the stepped blind hole type.

3. The valve element for the electronic expansion valve according to claim 1, wherein a length of the guiding section (21) is longer than that of the limiting section (22).

4. The valve element for the electronic expansion valve according to claim 1, wherein the first positioning groove (111) and an inner wall of the guiding section hole (11) are stepped.

5. The valve element for the electronic expansion valve according to claim 1, wherein the rotor cylinder (1) is a magnetic rotor cylinder, and 10 pairs of magnetic poles are evenly distributed on a peripheral wall of the magnetic rotor cylinder.

6. The valve element for the electronic expansion valve according to claim 1, wherein two first positioning ribs (211) in pairs and two second positioning ribs (222) in pairs are provided, which are symmetrically distributed on the side wall of the guiding section (21) and the side wall of the limiting section (22) respectively; and two first positioning grooves (111) in pairs and two second positioning grooves (121) in pairs are provided, which are symmetrically distributed at the outer end of the guiding section hole (11) and the inside wall of the limiting section hole (12).

7. The valve element for the electronic expansion valve according to claim 1, wherein four first positioning ribs (211) in two pairs and four second positioning ribs (222) in two pairs are provided, which are symmetrically distributed on the side wall of the guiding section (21) and the side wall of the limiting section (22) respectively; and four first positioning grooves (111) in two pairs and four second positioning grooves (121) in two pairs are provided, which are symmetrically distributed at the outer end of the guiding section hole (11) and the inside wall of the limiting section hole (12).

8. The valve element for the electronic expansion valve according to claim 1, wherein six first positioning ribs (211) in three pairs and six second positioning ribs (222) in three pairs are provided, which are symmetrically distributed on the side wall of the guiding section (21) and the side wall of the limiting section (22) respectively; and six first positioning grooves (111) in three pairs and six second positioning grooves (121) in three pairs are provided, which are symmetrically distributed at the outer end of the guiding section hole (11) and the inside wall of the limiting section hole (12).

* * * * *